United States Patent [19]

Strong

[11] 3,907,770
[45] Sept. 23, 1975

[54] PROCESS OF EXTRACTING CARRAGEENAN FROM SEAWEED

[75] Inventor: Clifford H. G. Strong, Guelph, Canada

[73] Assignee: Uniroyal Ltd., Montreal, Canada

[22] Filed: May 18, 1973

[21] Appl. No.: 361,703

[30] Foreign Application Priority Data

Feb. 5, 1973 Canada .................................. 162894

[52] U.S. Cl. ............................................. 260/209 R
[51] Int. Cl.² ...................... C07H 3/00; C08B 37/00
[58] Field of Search ................................. 260/209 R

[56] References Cited
UNITED STATES PATENTS

| | | | |
|---|---|---|---|
| 3,094,517 | 6/1963 | Stanley | 260/209 R |
| 3,176,003 | 3/1965 | Stancioff | 260/209 R |
| 3,280,102 | 10/1966 | Gordon et al. | 260/209 R |
| 3,305,543 | 2/1967 | Haskell | 260/209 R |
| 3,342,612 | 9/1967 | Foster et al. | 260/209 R |
| 3,382,229 | 5/1968 | Patton et al. | 260/209 R |

*Primary Examiner*—Johnnie R. Brown
*Attorney, Agent, or Firm*—Robert J. Patterson, Esq.

[57] ABSTRACT

Disclosed is a process for extracting carrageenan from seaweed of the Class Rhodophyceae which comprises digesting at elevated temperature a mixture of the seaweed with water and an alkaline earth metal hydroxide, or an alkali metal hydroxide, the seaweed content of the mixture being equal to at least about 9 percent by weight based on the dry weight of the seaweed, the digestion being carried out for a period of time necessary to obtain maximum yields of an extract whose properties have been significantly improved as a result of alkali modification.

Also disclosed is a process wherein the seaweed is pretreated with dilute aqueous inorganic acid, preferably nitric, sulfuric or hydrochloric acid, at a relatively low temperature, after which the acid-pretreated seaweed is washed with water, then rapidly heated to extraction temperature by means of, for example, live steam injection, and is then subjected to extraction by digestion in the manner described above.

In addition there is disclosed a process which utilizes the increased solubility of the carrageenan present in seaweed which has been pretreated with acid in the manner described, to selectively extract a certain proportion of the Lambda-($\lambda$-) carrageenan fraction and to recover the residual carrageenan with enriched Kappa-($\kappa$.) content.

16 Claims, No Drawings

PROCESS OF EXTRACTING CARRAGEENAN FROM SEAWEED

BACKGROUND OF THE INVENTION

The invention relates generally to the process of extraction of mucilaginous materials found in certain marine plants of the Class Rhodophyceae, and, more particularly, to an improved method of extracting carrageenan, and fractions thereof, from the seaweed *Chondrus crispus*, or *Gigartina mamillus*, more commonly known as Irish moss, Carragheen, Perl moss, Rock salt moss, and Killeen pigwrack.

Carrageenan is the name given to the mixture of water-soluble galactan sulfuric acid esters, or mixtures or polysaccharide sulfate salt complexes found in certain species of marine plants of the Class Rhodophyceae, typical examples being: *Chondrus crispus*, *Gigartina stellata*, *Gigartina radula*, *Eucheuma striata*, *Eucheuma cottonii*, and *Eucheuma spinosum*.

Carrageenan has had extensive use for many years as a stabilizer and thickener for dairy, food, pharmaceutical products, and many other industrial applications such as water-based paints and inks. A property of carrageenan solutions which has influenced its use for many of these applications is its ability to form strong aqueous gels, and to react with proteins, such as those in milk to form milk gels, or to stabilize the suspension of cocoa particles in chocolate milk.

The aqueous gel strength and milk reactivity of carrageenan are therefore very important and may be determined in the following manner:

For aqueous gel strength, the extractive to be tested is dissolved, by heating and agitation, in water containing potassium chloride. The hot solution is diluted to give the prescribed percentages of the extractive and potassium chloride, then poured into a covered vessel of about 2 inches diameter and 2–3 inches depth. The vessel and contents are then placed in a water bath, maintained at the required testing temperature (10°–15°C.), and allowed to cool. After a reasonable period of time the vessel is removed from the water bath, the gelled content is carefully removed, inverted and replaced in the vessel. The vessel and gel are then placed on the pan of a balance, and a plunger of known diameter is gradually applied to the surface of the gel, with measured force, until the force suddenly diminishes at the moment of rupture of the gel. The maximum force applied, just prior to rupture of the gel, is noted as the gel strength of the particular extractive, at the prescribed concentration, temperature of measurement, and for a given plunger diameter.

For the determination of milk reactivity, the same procedure as for aqueous gel strength is followed except that the water and potassium chloride are replaced by homogenized milk. The strength of the gel formed as a result of reaction between the carrageenan and the milk protein is referred to as the milk reactivity of the particular extractive, at the prescribed concentration, temperature of measurement, and for a given plunger diameter.

The gel strength, and milk reactivity of carrageenan products may vary widely depending on seaweed species, seasonal variations and method of extraction. Carrageenan may be extracted by various techniques, or separated after extraction, into several fractions, the principal ones being Lambda-($\lambda$) and Kappa-($\kappa$-) carrageenans. The former may be regarded as virtually nongelling, although it may have some milk reactivity. The latter fraction forms strong aqueous gels and has a high milk reactivity. Such properties, unlike those of the $\lambda$-fraction, are capable of being improved substantially by alkali modification, as for example, by the method of this invention. In instances where, as a result of, for example, seasonal variation or source, the $\lambda$-carrageenan content of the seaweed is higher than that which will give an extractive having desirable gel strength and/or milk reactivity, it would be an advantage to selectively extract, by the method disclosed herein, part of this $\lambda$-fraction. Thus, the $\kappa$-fraction content of the residual carrageenan is enriched prior to extraction by the digestion process of this invention. The $\lambda$-carrageenan extract solution may be processed by conventional means so as to recover the dry extractive for use in applications suited to its particular properties, for example, where its high solution viscosity can be utilized with advantage.

The experiments described herein, for the purpose of illustrating the principles of this invention, refer particularly to the main commercial source of carrageenan, the seaweed *Chondrus crispus*. It is understood that other carrageenan containing seaweeds, such as those named previously, may be treated in a similar manner to *Chondrus crispus*, to produce similar products.

FIELD OF INVENTION

The field of invention is a process for the extraction of carrageenan from seaweeds of the Class Rhodophyceae.

DESCRIPTION OF THE PRIOR ART

Extracts of *Chondrus crispus* (or Irish moss) have been prepared by the basic method of hot water extraction for many years. The method is, therefore, well known and practised in the art. The seaweed, preferably whole to facilitate draining, is cold water washed and then extracted with water under alkaline conditions at temperatures ranging from 80° to 150°C for up to 6 hours. A large quantity of filter aid is added and the insoluble portion of the seaweed is then removed by filtration. The pH of the filtrate may be modified by acid addition and the extract is recovered from solution by alcohol precipitation or drum drying. The physical properties of extracts, such as aqueous gel strength, milk reactivity, and solution viscosity, vary considerably depending on the source of the seaweed, time of harvesting, and the treatment which the seaweed undergoes in the process of extraction. Various extraction procedures have been adopted, and form the bases for various patents, whereby the extracts are modified by various means to improve their properties for specific applications.

A known commercial method of carrageenan extraction consists in heating Chondrus crispus, (milled to pass through a one-fourth inch mesh screen, and washed in cold lime water, or water), in lime water (containing an excess of lime, ($Ca(OH)_2$), the amount of lime being equal to about 20 percent by weight of the dry seaweed) for about 4 hours at a temperature of approximately 100°–120°C in an autoclave. The concentration of seaweed in the mixture is such as to give a final extract solution concentration of approximately 0.8 percent by weight. A filter aid is added and the hot slurry, which typically is at a temperature of 90°–100°C, is given a coarse filtration. The hot filtrate, which contains some residual lime, both solid and dissolved, is left for 18–24 hours in an insulated tank where the extract undergoes alkali modification, which improves the aqueous gel-forming and milk reactivity properties of the extract. The solution is then filtered, neutralized, and the product recovered by alcohol precipitation and drying. The short extraction period is rather inefficient but facilitates separation of the seaweed particles which still remain relatively whole. Because of incomplete extraction and retention of product in the highly swollen seaweed particles and in the filter cake, yields are rather low and are understood to be only of the order of 25–30 percent by weight based on dry seaweed feedstock.

The prior art known to the inventor consists of the following U.S. Pat. Nos.

| Siehrs | 2,516,023 | July 18th, 1950 |
| --- | --- | --- |
| Le Gloahec | 2,624,727 | Jan. 6th, 1953 |
| Stanley | 3,094,517 | June 18th, 1963 |
| Stancioff | 3,176,003 | March 30th, 1965 |
| Gordon, et al. | 3,236,833 | Feb. 22nd, 1966 |
| Gordon, et al. | 3,280,102 | Oct. 18th, 1966 |
| Foster, et al. | 3,342,612 | Sept. 19th, 1967 |
| Jonas | 3,476,741 | Nov. 4th, 1969 | and an article by Percival, et al. published in Nature, 145, 1020-1 (1940).

The prior art cited above does not foreshadow or teach the present invention. Siehrs seeks to merely purify black, unbleached Irish moss, while minimizing extraction thereof, by washing it with acidified heated water. The washed seaweed is ground to approximately 100 to 200 mesh then exposed to the bleaching action of direct sunlight before drying. Le Gloahec does not show digesting a mixture of the seaweed, alkaline material and water at elevated temperature; in fact, he does not contemplate any use of alkaline material.

Stanley describes the use of lime, or other alkaline materials, to modify the properties of seaweed mucilages, in particular, to improve the gel-forming properties of the extracts. The patent discloses the need to add about 50 percent or more by weight of lime, based on the dry weight of the extract, to modify the extract either during extraction and prior to filtration, or after filtration of the extract solution from the cooked seaweed slurry. Treating time is from 3 hours to 6 hours at from about 80° to 150°C and the extract has a concentration of between 1.6 and 1.8 percent by weight. Yields of product are 43 to 44 percent by weight. Stanley does not teach the acid pretreatment technique, or the process of digestion at high seaweed concentrations which characterize the present invention. The other patents likewise do not show the high concentration (at least about 9 percent by weight) of seaweed in the mixture subjected to digestion or extraction which is a characteristic feature of the present invention. Thus Stancioff uses a maximum of only about 5.27 percent of seaweed in Examples 1–3 and 12, about 2.5 percent in Examples 5–9, and 5 percent in Examples 4, 10 and 11. Stancioff's examples all relate to selective extraction of λ- and κ-carrageenan fractions. Example 13 is not relevant since it relates to selective extraction of carrageenan fractions from a carrageenan extractive powder. Gordon et al. U.S. Pat. No. (3,236,833) have a maximum of 5.0 percent of seaweed in the extraction. Gordon et al. U.S. Pat. No. (3,280,102) do not state the seaweed concentration in the extraction step. Foster et al. show a concentration of about 3.9 to 4.4 percent. Jonas shows only approximately 4.0% of seaweed.

The Percival et al. reference merely discloses broadly the extraction of carrageenan with hot water and does not mention the use of calcium hydroxide or other alkaline material in the extraction.

None of the above references is relevant to that aspect of the present invention wherein the seaweed is pretreated with dilute aqueous inorganic acid, especially nitric, sulfuric, or hydrochloric acid, at low temperature (from 10° to 20°C), after which it is washed with cold water to remove excess acid, leaving the seaweed in a slightly acidic state having a pH of approximately 6 to 6.5. The pretreated seaweed is then heated rapidly to extraction temperature, 95°–98°C, by any suitable means such as live steam injection into the cold wet seaweed mass, after which it is mixed with boiling water and an alkali metal hydroxide, or alkaline earth metal hydroxide. The concentration of original dry seaweed based on the resulting total mixture is equal to at least about 9 percent by weight. It has been found that the rates of disintegration of the seaweed, extraction of carrageenan and alkali modification are greatly accelerated by the practise of the present invention.

Thus acid pretreatment has been demonstrated to dramatically increase the rate of extraction of the carrageenan present in seaweed. As a result, the processes which form the basis of the present invention have made possible, for example, a very significant reduction in the time required for the selective extraction of λ-carrageenan. This is illustrated in Example 7 where extraction times are about 2 to 4 hours. Stancioff shows 24 hours in Examples 5 to 11, 48 hours in Examples 1 to 3 and 12, and 60 hours in Example 4. Despite these extraction times, Stancioff's yields of substantially pure λ-carrageenan (as indicated by low aqueous gel strength) are not very high, the maximum being about 7 to 8 percent. Stancioff also teaches that the presence of alkalies during this selective extraction process is necessary in order to produce a swelling of the sea plant and a dissociation of the carrageenan from the complex in which it exists in situ, whereby diffusion of the soluble component into the extraction medium is promoted. Siehrs shows acid treatment of seaweed but for a totally different purpose not at all connected with an improvement in the subsequent extraction of the seaweed. Gordon et al. U.S. Pat. No. ( 3,280,102, Example 2) show a wide range of acid concentration indicated by a pH of between 5.0 and 1.5 in an acid pretreatment stage. It appears that their object was to remove cations present in the natural carrageenan and to replace them by sodium and potassium in a specific molar ratio. These inventors neutralized their seaweed slurry prior to extraction. This makes it clear they did not carry out their acid pretreatment with the objective of greatly accelerating disintegration and extraction of the seaweed which forms the basis of this invention. Their Table II and Example 8 are no more relevant than Example 2.

There is no reference known to the inventor which is relevant to that aspect of the present invention wherein the hot mixture of seaweed, water and alkali (at a seaweed concentration, on a dry basis, of at least about 9 percent by weight) is digested (extracted) in a continuous manner.

SUMMARY OF THE INVENTION

The invention in its broader aspects is a process of extracting carrageenan from seaweeds of the Class Rhodophyceae comprising digesting at an elevated temperature a mixture of the seaweed with water and an alkaline material, the seaweed content of the mixture subjected to digestion being equal to at least about 9 percent by weight, on a dry basis, i.e. at least about 9 percent by weight of dry seaweed based on the weight of the mixture. Preferably the seaweed concentration ranges from about 9 to about 13 percent by weight. The amount of alkaline material in the mixture is equal to at least about 5 percent by weight, and preferably from about 5 to about 20 percent by weight, of the initial dry weight of seaweed. The alkaline material is either an alkaline earth metal hydroxide or an alkali metal hydroxide, calcium hydroxide being preferred. The digestion step is preferably carried out at a temperature of at least 90°C, ranging upwardly to the boiling point of the mixture. The digesting step is usually conducted at atmospheric pressure. However, it can be carried out under superatmospheric pressure. The practical upper limit for the temperature of digestion is 160°C. The digestion is continued for at least 5 hours, generally for from 8 to 24 hours, and preferably from 16 to 24 hours. Upon completion of digestion the extracted carrageenan, which is in the aqueous phase, is recovered in any suitable manner. A preferred recovery method comprises admixing the digested mixture with water at an elevated temperature, preferably at least 90°C, and preferably in an amount approximately equal to between 1 and 1.5 times the amount of water present in the digested mixture, followed by separation of the liquid phase from the solids, preferably by centrifugal means, neutralizing the separated liquid phase, and recovering the carrageenan from the resulting neutralized liquid phase in any manner known to the art.

In a more specific and preferred aspect, the process of the invention comprises pretreating the seaweed with dilute aqueous inorganic acid, especially nitric acid, sulfuric acid or hydrochloric acid, at a low to moderate temperature of from 5° to 40°C, the preferred acid, because of its low corrosion of stainless steel, being nitric acid. This acid pretreatment offers important advantages among which are (1) it substantially increases the solubility, rate of extraction, and yields of carrageenan, (2) rapid disintegration of the seaweed plant is obtained, (3) it permits highly efficient and rapid selective extraction of the λ-carrageenan fraction prior to extraction of the residual carrageenan with enriched κ-content, and (4) it permits digestion and extraction of the seaweed at concentrations as high as about 13 percent by weight (on a dry basis) of seaweed. In this pretreatment step the pH of the aqueous acid phase is carefully controlled by limiting the concentration of the acid in the aqueous phase to from about 0.05 to about 1 percent by weight, a concentration of about 0.2 to 0.5 percent by weight being especially suitable. The time of acid pretreatment typically ranges from 5 to 30 minutes, 15 minutes being preferred. (Extended times, or elevated temperatures would result in loss of product in the acid phase and subsequent water washes.) Following the acid pretreatment, the aqueous acid phase is separated from the seaweed in any suitable way such as by draining. The resulting seaweed is washed with cold water; the washed seaweed, having a pH not lower than about 6.0 and preferably ranging from about 6 to about 6.5, may be subjected to extraction by the method outlined above.

Preferably the acid-pretreated and water-washed seaweed is rapidly heated to a temperature of at least approximately 90°C prior to its being admixed with hot water and alkaline material in the amounts described above in preparation for the digestion (and extraction) step disclosed above.

Alternatively, if the carrageenan content of the acid pretreated, water-washed seaweed is such as to contain an undesirable quantity of the non-gelling λ-carrageenan fraction in proportion to its κ-carrageenan content, it may be desirable to reduce the proportion of the λ-fraction by a process of selective extraction as outlined in the next paragraph, and illustrated in Example 7.

The selective extraction of the λ-carrageenan from the acid pretreated, water-washed, whole sea plants is effected, in a further embodiment of the invention, by treating the seaweed with an aqueous solution of a neutral, or slightly acidic, water-soluble salt at a temperature of from about 20° to 60°C. The salt used is such that the λ-carrageenan fraction is soluble while the κ-carrageenan fraction is insoluble under the conditions of salt concentration and solution temperature employed. Such salts are well known by those skilled in the art, potassium chloride being particularly effective and preferred. Water is added to the pretreated seaweed until the plants are immersed, together with sufficient potassium chloride to give an aqueous solution thereof having a concentration of approximately 1 to 10 percent and preferably from about 1 to about 2 percent (including that quantity of water contained in the wet seaweed). The mixture is held, with or without agitation, at a preferred temperature of from about 50° to 60°C for a period of from about 1 to 5 hours depending on the degree of enrichment of κ-carrageenan content desired in the final product. The viscous extract solution of λ-carrageenan is separated from the seaweed mass by any suitable means such as draining, or pressing to expel the liquid. The residual seaweed mass is washed with a further quantity of warm potassium chloride solution and the extract is recovered from the combined solutions in any suitable manner known to the art, i.e. by alcohol precipitation and drying. The residual seaweed is then subjected to digestion, and extraction, at high seaweed concentration in the manner described above for unfractionated seaweed.

It is known, by those skilled in the art, that certain conditions of acidity in combination with other factors, such as elevated temperature, can cause depolymerization of carrageenan. However, when the seaweed is subjected to acid pretreatment and the extraction processes described herein, there is no apparent degradation or depolymerization, but the inventor has discovered that the carrageenan is substantially increased in solubility. When heated to extraction temperature, preferably in a rapid manner, as for example by live steam injection, the seaplants, whole or partially comminuted, soften considerably, and disintegrate in the initial stages of mixing with boiling water and alkaline material, to give the concentrated seaweed slurry described herein. The addition of alkali at this stage, which is required for alkaline modification of the carrageenan, also eliminates the possibility of of any acid-induced depolymerization or degradation of the carrageenan.

Because of the formation of such a seaweed slurry, in which the alkaline material is intimately mixed into the dissolved or at the least highly hydrated carrageenan, further mixing or agitation may be dispensed with. Thus a substantial increase in the concentration of the seaweed mixture subjected to digestion and extraction becomes practicable. The slow process of alkali modification of the dissolved carrageenan begins immediately, and is also favoured by the increased concentrations of both alkali and carrageenan.

The concentrated slurry prepared as indicated above could be held for the rather lengthy period of time required for alkali modification, in any suitable vessel equipped to maintain the required elevated temperature. One advantage of this high seaweed concentration is that smaller vessels than would be required normally are practicable. However, since it is not possible to process a digested batch immediately through the subsequent dilution and solids separation operations, unless a number of vessels are employed to achieve continuity of the process, the adoption of a single continuous digestor becomes logical. Without the acid pretreatment and the steps outlined herein, such a procedure would be difficult and rather impracticable.

The preferred method of continuous digestion may be carried out as follows: The aqueous seaweed slurry or suspension to be digested may be fed continuously into one end of a long column which preferably has a low diameter to length ratio, e.g. not over one-tenth, so that there will be uniform flow of the seaweed mixture therethrough at low fluid velocity. The hot mixture is maintained under adiabatic conditions, by insulation and electrical or steam trace heating, for the required residence time which can be from 5 to 24, and preferably from 16 to 24, hours, depending on the feed rate. The preferred form of continuous digestion unit is a U-shaped tower, which can comprise two vertical columns (e.g. 3 ½ feet in diameter and 20 feet high), having curved bottom portions which are joined together in any suitable way, as by welding. The mixture is fed into the top of one side of such a tower, flows continuously therethrough, and leaves the top of the other side. From the discharge outlet it is fed into a continuous dilution stage where it is diluted with water to give a mixture having a concentration of from about 4 to 5 percent of original dry seaweed. The dilution mixture is then ready for continuous separation of the insoluble materials present therein and for further processing of the extract solution.

The method of solids separation practised in the art is by addition of large quantities of diatomaceous earth filter aid followed by filtration of the resulting mixture in plate and frame filters. Cycle times for this step are understood to be small, due to rapid blockage of the filter media, and a number of filters are employed to achieve continuity. In the case of the diluted slurry prepared by the method of this present invention, its characteristics, such as solution viscosity, and the absence of large seaweed particles are such as to make possible solids separation by centrifugal means. A preferred type is a continuous, self-cleaning, disc centrifuge such as that supplied by the De Laval Company under their trade designation "B.R.P.X." (trademark).

This continuous process replaces the batch cooking process used in the art with the advantages of a continuous process. Thus, in a batch process, the digestion vessel cannot be used again until its contents have been passed through centrifuges or filters. In normal batchwise practices, several digestion vessels must be used to obtain continuity of processing. By using a continuous digestor and solids separator as described herein, equipment costs, materials costs (in particular filter aid), and power requirements (for the feed system and for trace heating) are considerably lower than for stirred digestion vessels and conventional solids separation techniques.

DESCRIPTION OF THE PREFERRED EMBODIMENTS OF THE INVENTION

The following techniques may be employed in the practice of this invention, and the Examples given are intended to be illustrative, rather than limiting.

Dry *Chondrus crispus* seaweed (whole plants or partially milled) is washed with one or more of cold dilute acid, lime water or cold water, to remove salts, sand and foreign matter. In a preferred method, the seaweed is washed with cold dilute acid. Nitric acid is favoured for its low corrosiveness to the common materials of construction such as stainless steel. The dilute acid, at a concentration of approximately 0.2 to 0.5 percent by weight, is contacted with the seaweed for a period of about 15 minutes. The drained seaweed is then washed with cold water for a period of approximately 10 minutes to give a final seaweed pH of 6 to 6.5.

The washing process may be carried out by any convenient method, but preferably is performed on a moving screen conveyor on which the seaweed is sprayed with the dilute nitric acid for about half the total length of the conveyor, then with cold water along two-thirds of the remaining conveyor length. The speed of the conveyor is such as to give the required residence time, and the wash water or dilute acid is recycled in a counter-current fashion.

The washed, acid-pretreated and slightly acidic seaweed is transferred by any suitable means to a horizontal heating and mixing vessel where the wet seaweed is first heated with steam to a temperature of between 90° and 100°D. During the heating process, the seaweed is conveyed by screw conveyor along the trough-shaped vessel to a point where boiling water and an alkali are added and mixed into the heated seaweed mass. This gives a seaweed content, based on initial dry weight, of approximately 9 to 13 percent. Various alkalies, such as the carbonates of sodium, potassium, or lithium, or the hydroxides of sodium, potassium, lithium or calcium may be used. Calcium hydroxide is preferred by virtue of its low cost, nontoxic nature, relative insolubility, and ease of removal after completion of the extraction and digestion of the seaweed. The amount of calcium hydroxide used is in the preferred range of from about 5 to about 20 percent by weight of the original dry weight of seaweed.

The hot (95°–100°C) intimate mixture of seaweed, water and alkali is transferred by suitable means, i.e. by screw conveyor or pump, to a heated, insulated vessel. The mixture is held for the required residence time which may be from about 8 to 24 hours but preferably from 16 to 24 hours. During this time, complete extraction of the carrageenan is achieved, together with alkali modification, to give the desired physical properties of the extract, i.e. high aqueous gel strength and high milk reactivity.

The inventor has found that during the process of mixing the hot, slightly acidic seaweed with boiling water and alkali, as described herein, to give a uniform mixture containing a high concentration of from 9 to 13 percent by weight of original dry seaweed, the sea plants disintegrate virtually completely to form a highly viscous, paste-like mass. This mixture, at the concentrations of seaweed described, is just sufficiently fluid to be transferred by pumping, and since it can be conveniently produced on a continuous basis and requires no further mixing, it becomes practicable and preferable to employ a continuous digestor having suitable capacity. Accordingly, the mixture to be digested is pumped continuously into the inlet side of a U-shaped tower of the kind described above in which it is maintained under adiabatic conditions. Under the influence of slight pressure sufficient to maintain flow, this mixture travels very slowly therethrough to emerge at the exit side of the digestor where it is then fed to a continuous dilution stage. It is diluted with hot or boiling water to give a seaweed concentration of approximately 4 to 5 percent original dry seaweed concentration and is mixed for the short period of time required to disperse the extracted seaweed evenly. This diluted slurry has viscosity characteristics which permit the use of centrifugal equipment, as described previously, for the separation of extract solution from the insoluble seaweed residues and undissolved lime. This method of separation is more efficient and more nearly continuous than filtration and eliminates the necessity for the use of large quantities of filter aid, with unavoidable product loss.

The clarified liquid, obtained by centrifuging, may still contain a very small quantity of solids and is given a fine filtration. The resulting extract solution is then processed in any manner known in the art to recover the dry extracted carrageenan product.

In a further method in accordance with this invention the acid-pretreated and water-washed seaweed prepared as described herein, is treated with a warm aqueous solution of a neutral or slightly acidic water-soluble salt in which, at the conditions of salt concentration and solution temperature, the $\lambda$-carrageenan fraction of the total carrageenan present in the seaweed is soluble while under the same conditions, the $\kappa$-carrageenan fraction is insoluble. Suitable salts are well-known in the art and are typified by water-soluble salts of ammonium, sodium, potassium, lithium, rubidium, cesium, calcium, barium, strontium, and magnesium. Because of considerations of cost and/or toxicity, it is highly unlikely that compounds of rubidium, cesium, barium or strontium would be used. In the practice of this present invention, the improved extraction rates obtained are due to the increased solubility of carrageenan in the slightly acidic seaweed prepared by the process of acid pretreatment disclosed herein. The use of hydroxides or other alkaline salts of the cations listed above is quite unsuitable, since it is necessary that the salt used form a neutral, or possibly slightly acidic (i.e. approx. pH 6.5) solution. Of the possible salts, those of potassium are particularly effective and of these, potassium chloride is preferred.

In practising this further method, dry *Chondrus crispus* (preferably whole plants, or only partially milled plants to facilitate draining of solutions with which it is treated) is acid pretreated and water washed in the manner disclosed herein. The pretreated seaweed is then treated with an aqueous solution of potassium chloride at a concentration of about 1 to 10 percent and at a temperature of about 20° to 60°C, the preferred solution concentration being about 1 to 2 percent and the preferred temperature being 50° to 60°C. Treatment time may range from about 1 to 5 hours and the volume of potassium chloride solution is such as to give a seaweed concentration in the mixture of about 4 to 7 percent by weight. This yields a $\lambda$-carrageenan extract solution concentration of from about 0.5 to 1.5 percent by weight. Higher concentrations than this are highly viscous and not easily separated from the residual highly-hydrated seaweed mass by the more convenient method of draining.

The selective extraction process may be carried out in any suitable vessel. Agitation is not essential, but is is preferable to circulate the potassium chloride solution through the seaweed mixture. Alternatively and preferably, the pretreated seaweed is fed to a moving screen conveyor having the required capacity and speed so as to provide the required extraction period. The warm (50°–60°C) potassium chloride solution, at a suitable concentration to give the desired 1 to 2 percent concentration taking into account the water content of the set seaweed, is fed to the discharge end of the conveyor and is recycled back over the seaweed in counter-current fashion, with the temperature being maintained by suitable heat exchangers. The resulting $\lambda$-carrageenan extract solution is separated by draining and clarified by filtration and the extractive recovered by any method known in the art, i.e. by alcohol precipitation and drying.

The seaweed residues which contain the $\kappa$-carrageenan fraction and residual, unextracted $\lambda$-carrageenan, are extracted by the process of digestion at a seaweed concentration of from 9 to 13 percent of the total mixture, in the presence of from 5 to 20 percent calcium hydroxide (both percentages being based on original dry seaweed weight), for about 8 to 24 hours by the process disclosed herein for acid pretreated seaweed which has not been subjected to the selective extraction process (e.g. Example 3).

EXPERIMENTAL

The following experimental work will aid in more fully understanding the invention.

All temperatures referred to in this section are degrees Centigrade. The yield figures represent percent by weight of air dried carrageenan (containing approximately 10 to 12 percent by weight moisture), based on moisture free seaweed.

For both viscosity and aqueous gel strength determinations, solutions containing 1 percent by weight of the carrageenan product and 1 percent by weight potassium chloride were prepared. Viscosities of these solutions were determined in centipoises at 60°, using a Brookfield viscometer at 50 R.P.M. spindle speed (Examples 1, 2, 5) and 60 R.P.M. (Examples 3, 4, 6 and 7). Aqueous gel strength values were determined in the manner detailed above (under "Background of the Invention") by cooling the solutions to 10°–15° and measuring the maximum force in grams, just prior to rupture, using a plunger having a diameter of 19 mm.

Milk reactivity values were determined in the manner detailed under "Background of the Invention" and above for aqueous gel strength except that 0.154 percent by weight of the carrageenan product was dissolved in hot homogenized milk, the solution cooled to 10° and the maximum force in grams measured, just prior to rupture, using a plunger having a diameter of 29 mm.

EXAMPLE 1

One hundred grams of dry *Chondrus crispus*, milled to approximately one-fourth inch mesh, was treated with 1 litre of cold saturated lime water for 3 hours. The lime water was decanted and a further 1 litre portion of cold lime water was added. The mixture was allowed to stand 1 hour whereupon the seaweed was drained. The washed seaweed was transferred to a 1-litre stirred reaction kettle containing 20 grams calcium hydroxide and hot water was added until the kettle was almost full. The mixture (the seaweed concentration of which was about 10 percent by weight of original dry seaweed) was then heated to 95°–98° and the temperature maintained for 24 hours. The cooked seaweed slurry was diluted to approximately 2 litres, filter aid was added, and the mixture filtered. The dry filter cake was washed with a small quantity of hot water and the extracted, alkali modified carrageenan product was recovered from solution by alcohol precipitation, alcohol washed and dried. The properties of this product thus obtained are given in Table I(a) below.

A similar experiment was carried out with a different sample of *Chondrus crispus* except that in this case whole seaweed plants were used and extracted without agitation or stirring, after an initial mixing of the seaweed, hot water, and lime, for 20 hours in the presence of 15 grams of calcium hydroxide. The diluted extraction slurry was centrifuged to separate insoluble materials from the extract solution which was further clarified by fine filtration. The properties of the product thus obtained are given in Table I(b) below.

TABLE I

|     | Yield % | Solution Viscosity (Centipoises) | Aqueous Gel Strength (Grams) | Milk Reactivity (Grams) |
|-----|---------|----------------------------------|------------------------------|--------------------------|
| (a) | 56.9    | 35                               | 1000                         | 189                      |
| (b) | 48.6    | 72                               | 1400                         | 204                      |

This example demonstrates the principles of this invention, in that it employs a high seaweed concentration (about 20%) during the extraction stage to produce a very high yield of carrageenan obtained by prolonged extraction of the seaweed.

The solution viscosities of both carrageenan products are low as a result of the prolonged extraction times and the effect of the alkali present, but aqueous gel strength and milk reactivity are extremely high and the products are very suitable for the commercial uses of carrageenan.

The example also illustrates the economic advantages of this present invention and is believed to represent a considerable advance in the process of extraction of carrageenan. Advantages include the following: (1) water consumption is kept to a minimum; (2) lime usage is either similar to or less than that in other known processes for production of carrageenan having similar properties; (3) extraction vessels, and other vessels used in the process, are reduced in size and costs; (4) product yield is a maximum and considerably higher than known process; (5) plant operation costs are reduced in several ways; for example, stirring is not required during extraction; it is possible to separate insoluble materials by centrifuging thus reducing filter aid requirements; solution concentrations are higher than normal thus reducing drying costs whichever method of recovery of dry product is employed.

EXAMPLE 2

This example illustrates how cold, very dilute acid pretreatment of the seaweed favours subsequent extraction of carrageenan from the seaweed. One hundred grams of dry *Chondrus crispus* (whole plants) was treated with cold 0.5 percent nitric acid for 15 minutes, drained, and the resulting pretreated seaweed washed with cold water on a wire gauze screen. The washed, slightly acidic seaweed, was then transferred to a beaker containing 1 litre of cold water, then left at room temperature for a total of 20 hours. The resulting viscous mixture was diluted to approximately 2 litres, filter aid added and the mixture filtered to recover the extract solution. The pH of the filtrate was adjusted to 7 with sodium hydroxide solution and the extract recovered by alcohol precipitation and drying. The properties of the resulting dry carrageenan product are shown in Table II.

TABLE II

| Yield % | Solution Viscosity (Centipoises) | Aqueous Gel Strength (Grams) | Milk Reactivity (Grams) |
|---------|----------------------------------|------------------------------|--------------------------|
| 29.4    | 52                               | 169                          | 48                       |

It is apparent from the results of this experiment that an acid pretreatment of the seaweed gives a marked increase in the solubility and rate of extraction of the carrageenan contained therein. Under normal extraction conditions, i.e. with the seaweed neutral or alkaline, extraction of whole *Chondrus crispus* plants, at the temperature employed in this experiment, would give very low yields of product. (For example, a yield of 4.1 percent has been obtained in a 64-hour extraction period under neutral conditions). An increase in temperature, however, significantly increases the rate of extraction so that at temperatures normally employed in the practise of the invention, i.e. 90°–100°, s substantial portion of the carrageenan content of the seaweed may be extracted in the relatively short period of an hour or so. It follows that if the rate of extraction at room temperature is increased from virtually zero to the extent obtained in this example, as a result of the acid pretreatment, then an increase in digestion temperature to, for example 90°–100°, will result in a very dramatic increase in extraction rate, together with breakdown of the sea plant structure, compared with that normally obtained. Such results have been uniformly obtained in the practise of the invention by the use of acid pretreatment followed by digestion at such higher temperatures.

The properties of the product obtained in this experiment are poor with respect to aqueous gel strength and milk reactivity due to the absence of alkali modification and possible acid degradation caused by the extended extraction period. A preferred method of extraction which forms the basis of practising the invention described herein is: (a) to acid treat and water wash the seaweed so that the final pH is of the order of 6 to 6.5; (b) to heat the treated seaweed to 90°–100° with steam, or hot water, so that the carrageenan is very rapidly dissolved and the sea plant structure broken down; (c) then to mix in an alkali together with such water as may be required to give a homogeneous concentrated mixture containing about 9 to 10 percent by weight of seaweed; (d) to continue the digestion process for a sufficient length of time to achieve the required degree of alkali modification.

EXAMPLE 3

This example also illustrates how cold, very dilute acid pretreatment of the seaweed favours subsequent extraction and alkali modification of the carrageenan present in the seaweed.

One hundred grams of dry whole *Chondrus crispus* plants was pretreated for 15 minutes with 2 litres of 0.2% (by weight) nitric acid at approximately 15°. The solution was decanted, and fresh cold water was added. The seaweed was allowed to soak for 5 minutes, drained, then given a further 5 minute soak in fresh cold water, and drained.

The pretreated wet seaweed was transferred to a one-litre reaction kettle and boiling water was added to give a total volume of just under one litre. The mixture was heated to approximately 90° in about one-half hour, by which time, the seaweed had completely broken down into a highly viscous mass. Calcium hydroxide (20 grams) was added and mixed into the hot seaweed mixture, the temperature was raised to 95°–98° and maintained for 18 hours. The seaweed concentration in the mixture subjected to digestion again was about 10 percent. The cooked seaweed slurry was diluted to approximately 2½ litres, filter aid was added, and the mixture filtered. The dry filter cake was washed with a small quantity of how water and the extracted, alkali modified carrageenan product was recovered from solution, after neutralization with hydrochloric acid to pH 7, by alcohol precipitation and drying. The properties of the product thus obtained are given in Table III below.

TABLE III

| Yield % | Solution Viscosity (Centipoises) | Aqueous Gel Strength (Grams) | Milk Reactivity (Grams) |
|---|---|---|---|
| 51.0 | 48 | 1330 | 178 |

This example is typical of many which could be given to illustrate the principles of this present invention by which, as a result of the acid pretreatment prior to alkaline digestion a carrageenan product with excellent aqueous gel strength and milk reactivity is obtained in very high yield.

EXAMPLE 4

Several different seaweed samples were treated in a manner essentially the same as that of Example 3. The only exceptions were the *Eucheuma* species which were heated after the acid pretreatment and water washing by live steam injection into the wet seaweed mass and the extraction time for these two species was 20 hours instead of 18 hours. The results of the extractions are given in Table IV below.

TABLE IV

| Seaweed Species | Yield % | Solution Viscosity (Centipoises) | Aqueous Gel Strength (Grams) | Milk Reactivity (Grams) |
|---|---|---|---|---|
| *Chondrus crispus*, (high K-carrageenan content). | 44.6 | 25 | 2380 | 330 |
| *Gigartina stellata* | 52.0 | 19.5 | 610 | 110 |
| *Eucheuma cottonii* | 50.5 | 17.0 | 1850 | 418 |
| *Eucheuma spinosum* | 57.0 | 25.0 | 40 | 110 |

This example demonstrates that the process which forms the basis of this invention is applicable to other carrageenan containing seaweeds of the Class Rhodophyceae, the three species listed being those more commonly used commercially in addition to *Chondrus crispus*.

*Eucheuma spinosum* is recognized as giving a product of low, aqueous gel strength, and milk reactivity although by the process of this present invention there is a distinct improvement in milk reactivity over that which would be obtained normally. Product yields were very good in all cases and breakdown of the whole, acid pretreated sea plants was extremely rapid on heating prior to the digestion stage. This favoured the subsequent extraction and alkali modification of the carrageenan present in the seaweed.

EXAMPLE 5

This example gives experimental details of continuous digestion of the seaweed.

A. At 12 minute intervals, a mixture of 1 gram of milled dry *Chondrus crispus*, 0.2 gram of lime (calcium hydroxide), and 10 millilitres of water was fed into the inlet side of a glass U-shaped vessel, of approximately 1.5 inches internal diameter. The dry seaweed concentration was slightly under 9 percent by weight of the mixture. The outlet side of the vessel was fitted with an overflow tube, approximately 0.5 inch internal diameter, so positioned as to give the vessel a capacity of approximately 1 litre. The vessel was inserted in an oil bath, maintained at a temperature of 95°–98°, so that the inlet and overflow were just above the oil level. Stirring of the seaweed mixture was unnecessary.

After the seaweed mixture had been added as above at 12-minute intervals to the vessel for 18 to 20 hours, cooked seaweed slurry began to overflow from the outlet into a 500 millilitre flask fitted with a stirrer and an overflow, to which boiling water was added at the rate of 15 millilitres/12minutes. Addition of the seaweed mixture as above to the inlet side of the vessel was continued at 12-minute intervals throughout until the expiration of the collection period referred to below. After sufficient time had been allowed to establish steady conditions, the overflowing, diluted slurry was collected over a period of several hours to obtain a representative sample, filter aid was added and the mixture filtered. Dry carrageenan product was obtained from the filtrate by alcohol precipitation and drying.

B. Experiment (A) was repeated, except that the feed rates were doubled to effectively halve the residence time in the digestion vessel to approximately 9 to 10 hours.

C. Experiment (B) was repeated except that the seaweed was first pretreated with cold, 0.5 percent by weight nitric acid for 15 minutes, drained, then soaked twice with fresh cold water, 5 minutes each soaking. After this pretreatment, lime was added with stirring in an amount equal to 20 percent by weight based on dry seaweed weight, together with a weighed quantity of water to give a total water content similar to that of the mixture used in (B) for the digestor feed. Details of the products obtained appear in Table V below.

TABLE V

|     | Yield % | Solution Viscosity (Centipoises) | Aqueous Gel Strength (Grams) | Milk Reactivity (Grams) |
|-----|---------|----------------------------------|-----------------------------|-------------------------|
| (A) | 46.0    | 32.0                             | 2198                        | 220                     |
| (B) | 49.0    | 44.8                             | 359                         | 115                     |
| (C) | 44.6    | 28.8                             | 595                         | 145                     |

The above results illustrate the effectiveness of the continuous digestion process in that extraction, and alkali modification of carrageenan result from digestion of a mixture of seaweed, water, and alkaline earth metal hydroxide or alkali metal hydroxide over a period of time. The extent of alkali modification, resulting in an increase in aqueous gel strength and milk reactivity (A), depends on the digestion time. However, Experiment (C) shows that distinct improvement (cf. B) in aqueous gel strength and milk reactivity is obtained if the seaweed is given an acid pretreatment. It is thus possible to obtain product with properties comparable with (A) using acid pretreatment and a somewhat shorter digestion period.

EXAMPLE 6

A highly advantageous way of increasing the capacity or productivity of a given plant for the extraction of carrageenan from seaweed, without installing further equipment and without adversely affecting the yield and quality of product, is to increase the concentration of seaweed in the slurry of whole or comminuted seaweed fed to the digester equipment, in accordance with the present invention. To achieve these results using the continuous digestion concept described herein, two basic considerations must be satisfied, namely: (1) it must be possible to convey the seaweed mixture from the mixing stage to the inlet of the digester. A pump capable of pumping hot slurries having viscosities as high as 1,000,000 centipoises (cps.) may be used for this purpose; (2) once in the digester, it is preferable that the seaweed mixture be sufficiently fluid to flow, without the application of pressure which would increase the cost of the vessel employed, at the low velocities required for the desired residence times of 5 to 24 hours. Accordingly, the inventor has examined the properties of seaweed slurries having a seaweed content greater than 9 percent by weight (on the same basis set forth previously) to determine the maximum concentrations which will satisfy the requirements of (1) and (2) above. It is preferable also that the carrageenan be predominantly in solution and in intimate contact with the largely undissolved time at the start of the digestion period.

A series of experiments has been carried out to determine those seaweed concentrations which will satisfy the above requirements. A Chondrus crispus sample having a high $\kappa$-carrageenan content ($\kappa$:$\lambda$-carrageenan ratio 6.9 : 1) was used. For comparison purposes, experiments were also carried out using:

A. Chondrus crispus having a $\kappa$:$\lambda$-carrageenan ratio of 2.6 : 1

B. A sample of Chondrus crispus ($\kappa$:$\lambda$-carrageenan ratio of 6.9 : 1) omitting the dilute nitric acid pretreatment stage.

All experiments were carried out in an identical manner. The method used was as follows:

The required quantity of dry, unground seaweed (see Table VI) was weighed into a 1-litre reaction kettle. The seaweed was soaked in 1 litre of cold, 0.2 percent by weight, nitric acid for 15 minutes. After draining, the seaweed was then soaked twice in fresh cold water for a total of 10 minutes.

The drained pretreated seaweed was heated to 95°–100° by means of live steam injected into the center of the seaweed mass, the hot mixture was weighed, then sufficient lime, (20 percent by weight of the dry seaweed weight), and boiling water were added to give a total of 800 grams. The hot slurry was mixed, using a large spatula, to ensure complete distribution of the lime throughout the seaweed.

During this mixing process, the seaweed plants were observed to disintegrate, almost completely, to give a thick mixture having a porridgelike texture. (This effect was not so noticeable for (B) above.)

After reheating in a steam bath for 15 minutes, the viscosity of the hot mixture was determined using a "Brookfield" model R.V.T. viscometer with No. 7 spindle at 5 R.P.M.; also the mixture was examined visually for its ability to flow when the reaction vessel was turned on its side. The kettle, and contents, was then replaced in the steam bath and left overnight for a total cooking time of 18 hours after which time the viscosity was redetermined.

The cooked, concentrated seaweed mixture was transferred to a 3-litre reaction kettle and diluted by the addition of approximately 2 litres boiling water and filter aid. This mixture was stirred for 15 minutes to disperse the extracted seaweed evenly. (Excessive stirring was avoided so that preferably only the already-extracted, concentrated carrageenan solution would be diluted, and the possibility of further extraction of carrageenan from undigested seaweed (if any) minimized.) The dilute slurry was filtered in a pressure filter, the filtration being accomplished in 1 to 1½ hours at 40–70 p.s.i.g. The reaction kettle was rinsed twice with a small quantity of boiling water and the washings transferred to the filter to flush residual carrageenan solution from the filter cake.

The extracted, alkali modified carrageenan was recovered from the neutralized filtrate by alcohol precipitation, alcohol washed and dried. The results of the extractions, and the properties of the extracts, are given in Table VI.

TABLE VI

| Seaweed Used | Seaweed Weight Extracted (Grams) | Concentration of Dry Seaweed in Digestion Mixture (% Wt.)[1] | Seaweed Slurry Viscosity (Centipoises) | | Appearance of Slurry Before Digestion | Product Yield (% Wt.) | Solution Viscosity (Centipoises) | Aqueous Gel Strength (Grams) | Milk Reactivity (Grams) |
|---|---|---|---|---|---|---|---|---|---|
| | | | Initial | Final | | | | | |
| High K-Content | 96 | 12 | 200,000–240,000 | 82,000 | Fluid and Pourable | 52.6 | 27.5 | 2245 | 198 |
| Ditto | 104 | 13 | 480,000 | 144,000 | Fluid and Marginally Pourable | 52.6 | 27.5 | 2180 | 245 |
| Ditto | 112 | 14 | Approx. 700,000 | 220,000 | Extremely Thick, Not Pourable | 53.0 | 30.0 | 2460 | 224 |
| Low K-Content Comparison (A) | 96 | 12 | 141,000–160,000 | 92,000–96,000 | Fluid and Pourable | 51.0 | 31.0 | 1700 | 160 |
| High K-Content, No Acid Pretreatment Comparison (B) | 96 | 12 | Not determined, seaweed did not break down as in previous experiments | 184,000 | Very stiff mixture not fluid and not pourable | 47.0 | 55.0 | — | 255 |

[1]Concentration expressed as dry seaweed weight in 100 grams total mixture.

Examination of the data in Table VI reveals that a seaweed extraction slurry, prepared by the method indicated above, was essentially fluid at concentrations as high as 13 percent. Some seaweed species may permit the use of slightly higher concentrations depending on the type of carrageenan, and carrageenan content. The use of such high seaweed concentrations is made extremely feasible by the method of acid pretreatment disclosed. As indicated in Table VI, the use of untreated seaweed (B) gave a very stiff mixture at 12 percent seaweed concentration. The seaweed did not disintegrate as readily and as a result, carrageenan yield was approximately 5 percent lower than the high values from acid pretreated seaweed. From the results of the aqueous gel strength and milk reactivity determinations, it will be seen that very efficient alkali modification had occurred. It is apparent that products equal or superior to present commercial products may be obtained by this process.

It will also be seen from the viscosity figures in Table VI that extraction (digestion) vessels with stirring would be unsuitable for this process, and that the type of continuous digester described in Example 5 is preferable. Other advantages of continuous digestion have been set forth.

EXAMPLE 7

This example illustrates how cold, very dilute acid pretreatment of the seaweed favours subsequent selective extraction of the lambda carrageenan fraction present in the seaweed.

Two samples of *Chondrus crispus*, (whole plants, samples 1 and 2, harvested from the same area of Prince Edward Island on two separate occasions) were treated individually in the following manner:

A. One hundred grams of the seaweed plants was acid pretreated and water washed in a manner essentially the same as that of Example 3. To the wet pretreated seaweed, contained in a 1-litre reaction kettle, potassium chloride (9.3 grams) was added together with sufficient warm water to give a total water content of 1000 grams. The resulting potassium chloride solution (approximately 1 percent concentration) was decanted, heated and returned to the seaweed several times, in the space of 5 to 10 minutes, to mix the solution and to raise the temperature of the mixture to 50°–55°. The reaction kettle and contents were then placed in an oil bath maintained at a temperature of 55° for a total extraction time of 2 hours. The resulting viscous solution containing extracted λ-carrageenan was drained from the seaweed mass, the seaweed was washed with 500 millilitres of fresh 1 percent potassium chloride solution at 55° and drained. The washing and draining processes were completed in 15 minutes so that effectively the total extraction time was 2¼ hours. The combined solutions were filtered, and the λ-carrageenan precipitated by addition of an equal volume of isopropyl alcohol, washed with dilute aqueous alcohol containing approximately 50–60 percent by volume of alcohol, then with alcohol, dried and weighed.

The seaweed residue containing carrageenan, less that portion of λ-carrageenan already extracted, was heated to 95°–100° by means of live steam injection, then boiling water and 20 grams calcium hydroxide were added to give a total volume of 900–1000 millilitres. This mixture was digested for 18 hours at 95°–98° and the dry, extracted, alkali modified carrageenan recovered as in the preceding examples.

(B) Further 100 grams samples of the same *Chondrus crispus* sea plants were treated in the same manner as in (A) above except that the acid concentration in the pretreatment stage was increased from 0.2 percent by weight to 0.4 percent. The λ-carrageenan extraction time was also increased, from 2 to 4 hours, and because of the high viscosity of the resulting extract solution, which was not easily separated by draining, the extract solution was recovered by transferring the mixture to a cheese-cloth bag and pressing to expel the viscous solution. The seaweed residues were washed twice with 300 millilitres of fresh 1 percent potassium chloride solution at 55°. Pressing and washing were completed in 15 to 30 minutes. The extract solution and seaweed residues were treated as in (A) above.

To compare the results, and the properties of the carrageenan samples obtained from methods (A) and (B)

above, using the process of acid pretreatment, a further extraction was carried out on the same two *Chondrus crispus* samples as follows:

C. The seaweed samples were treated in exactly the manner as described in (A) above, the only exception being that the acid pretreatment was omitted, and instead the seaweed was treated with a cold aqueous solution containing 0.2 percent by weight calcium hydroxide. The seaweed, during the λ-carrageenan extraction stage, was therefore alkaline instead of slightly acidic as in the preceding Examples which form the basis of this present invention.

The results of the extractions A, B and C above are shown in Table VII.

TABLE VII

| Experiment | Seaweed Sample | Extract | Product Yield (%) | Solution Viscosity (c.p.s.) | Aqueous Gel Strength (Grams) | Milk Reactivity (Grams) | 2% Aqueous Gel[1] Strength (Grams) |
|---|---|---|---|---|---|---|---|
| A | 1 | λ-carrageenan | 3.8 | 308 | Too soft to measure | 21 | Insufficient sample |
| | | K-carrageenan | 50.2 | 150 | 2450 | 250 | Beyond normal instrument range |
| | 2 | λ-carrageenan | 4.3 | 180 | Too soft to measure | 36 | Insufficient sample |
| | | K-carrageenan | 49.0 | 200 | 2400 | 334 | Beyond normal instrument range |
| B | 1 | λ-carrageenan | 12.1 | 442.5 | Too soft to measure | 50 | 95 |
| | | K-carrageenan | 42.8 | 55.0 | 2960 | 336 | Beyond normal instrument range |
| | 2 | λ-carrageenan | 9.0 | 255 | Too soft to measure | 29 | 155 |
| | | K-carrageenan | 47.5 | 36.0 | 3760 | 364 | Beyond normal instrument range |
| C | 1 | λ-carrageenan | 0.9 | Insufficient sample | Insufficient sample | 39 | Insufficient sample |
| | | K-carrageenan | 48.4 | 67.5 | 2380 | 202 | Beyond normal instrument range |
| | 2 | λ-carrageenan | 0.8 | Insufficient sample | Insufficient sample | 44 | Insufficient sample |
| | | K-carrageenan | 46.5 | 67.0 | 2420 | 382 | Beyond normal instrument range |

[1]Aqueous gel containing 2% by weight carrageenan + 1% by weight potassium chloride prepared as described above. Normal instrument range for gel strength determination is approximately 5 to 5000 grams.

This example very clearly demonstrates the advantage and effectiveness of the acid pretreatment process as disclosed herein for the selective extraction of carrageenan fractions. λ-carrageenan yields obtained by method (A), and particularly method (B), were significantly higher than those obtained by method (C). The extraction times employed are considerably shorter than those disclosed previously, or those which would otherwise be required to obtain equivalent yields, without the acid pretreatment stage as described herein. Aqueous gel strengths and milk reactivities of the carrageenan fractions with enriched κ-content were extremely high. This shows the value of selective extraction of λ-carrageenan and of the subsequent extraction process at high seaweed concentration disclosed herein which form the basis of this present invention.

As will be obvious to those skilled in the art, the term "about 9 percent" used in this specification and in the claims to denote the lower limit for the seaweed concentration of the mixture subjected to digestion is to be interpreted with reasonable tolerance. Thus, as will be seen from some of the specific examples, it is intended to cover seaweed concentrations somewhat lower than 9 percent; it is intended to cover concentrations as low as 8.5 percent which is far above the concentrations employed in prior practice as exemplified by the references discussed above under "Description of the Prior Art".

The embodiments of the invention in which an exclusive property or privilege is claimed are defined as follows:

1. A process of obtaining carrageenan from seaweed of the Class Rhodophyceae which comprises digesting at a temperature of from 90° to 160°C a mixture of the seaweed with water and an alkaline material selected from the group consisting of alkaline earth metal hydroxides and alkali metal hydroxides, the seaweed content, on a dry basis, of said mixture being equal to at least about 9 percent by weight and the amount of said alkaline material being equal to at least about 5 percent by weight of the initial dry weight of seaweed in said mixture, and thereby causing carrageenan from said seaweed to dissolve in the aqueous phase of the digested mixture, separating carrageenan from the digested mixture.

2. The process of claim 1 wherein said alkaline material is calcium hydroxide.

3. The process of claim 2 wherein the amount of said calcium hydroxide is equal to from about 5 to about 20 percent by weight of the initial dry weight of seaweed in said mixture.

4. The process of claim 1 wherein the seaweed content, on a dry basis, of the mixture subjected to digestion is equal to from about 9 to about 13 percent by weight.

5. The process of claim 1 wherein the digested mixture is admixed with water at an elevated temperature, the resulting mixture is treated to separate the liquid phase from the solids, the liquid phase is neutralized, and carrageenan product is separated from the neutralized liquid phase.

6. The process of claim 5 wherein said water admixed with the digested mixture is at a temperature of at least 90°C and is employed in an amount approximately equal to 1 to 1.5 times the amount of water in the digested mixture.

7. The process of claim 1 wherein the digestion step is carried out in a continuous manner for from 8 to 24 hours.

8. A process of obtaining carrageenan from seaweed of the Class Rhodophyceae which comprises pretreating the seaweed with dilute aqueous inorganic acid wherein the concentration of acid ranges from about 0.05 to about 1 percent by weight, at a temperature of from 5° to 40°C, washing the thus-pretreated seaweed with water and thus obtaining seawood having a pH of not lower than 6.0, heating the seaweed and digesting at a temperature of from 90° to 160°C a mixture of the seaweed with water and an alkaline material selected from the group consisting of alkaline earth metal hydroxides and alkali metal hydroxides, the seaweed content, on a dry basis, of said mixture being equal to at least about 9 percent by weight and the amount of said alkaline material in said mixture being equal to at least about 5 percent by weight of the initial dry weight of seaweed in said mixture, and thereby causing carrageenan from said seaweed to dissolve in the aqueous phase of the digested mixture, and separating carrageenan from the digested mixture.

9. The process of claim 8 wherein said acid is selected from the group consisting of nitric acid, sulfuric acid and hydrochloric acid.

10. The process of claim 8 wherein said acid is nitric acid.

11. The process of claim 8 wherein the acidpretreated seaweed is washed with cold water prior to the digesting step so that the resulting seaweed has a pH in the range of from about 6 to about 6.5.

12. A process of obtaining carrageenan from solid undissolved seaweed of the Class Rhodophyceae containing $\lambda$- and $\kappa$-carrageenan components, which process comprises pretreating the seaweed with dilute aqueous inorganic acid wherein the concentration of acid ranges from about 0.05 to about 1 percent by weight, at a temperature of from 5° to 40°C, washing the thus-pretreated seaweed with water and thus obtaining seaweed having a pH of not lower than about 6.0, treating said acid pretreated, water washed seaweed with an aqueous solution of a neutral, or slightly acidic, water-soluble salt in which, under the conditions of salt concentration and temperature, the $\lambda$-carrageenan component is rendered substantially more soluble than the $\kappa$-carrageenan component and thereby causing the $\lambda$-carrageenan component to go into solution in substantial amount while the $\kappa$-carrageenan component is selectively prevented from going into solution, separating the solution containing the dissolved $\lambda$-carrageenan component from the solid residue containing the undissolved $\kappa$-carrageenan component, digesting a mixture of said solid residue, hot water and an alkaline material selected from the group consisting of alkaline earth metal hydroxides and alkali metal hydroxides at a temperature of from 90° to 160°C, the seaweed content, on a dry basis, of said mixture being equal to at least about 9 percent by weight of original dry seaweed and the amount of said alkaline material in said mixture being equal to at least about 5 percent by weight of the initial dry weight of seaweed in said mixture, and thereby causing the $\kappa$-carrageenan component to dissolve in the aqueous phase of the digested mixture, and separating the $\kappa$-carrageenan component from the digested mixture.

13. The process of claim 12 wherein said salt is potassium chloride.

14. The process of claim 13 wherein the amount of said potassium chloride is such as to give a solution of approximately 1 to 10 percent and wherein the temperature at which said treating step is conducted is about 20° to 60°C.

15. The process of claim 14 wherein the temperature at which said treating step is conducted is 50° to 55°C.

16. The process of claim 12 wherein the $\lambda$-carrageenan extraction stage is carried out for a period of time of from approximately 1 to 5 hours.

* * * * *